United States Patent
Croxford et al.

(10) Patent No.: US 11,544,910 B2
(45) Date of Patent: Jan. 3, 2023

(54) SYSTEM AND METHOD FOR POSITIONING IMAGE ELEMENTS IN AUGMENTED REALITY SYSTEM

(71) Applicant: Arm Limited, Cambridge (GB)

(72) Inventors: Daren Croxford, Swaffham Prior (GB); Roberto Lopez Mendez, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/150,566

(22) Filed: Jan. 15, 2021

(65) Prior Publication Data
US 2022/0230396 A1    Jul. 21, 2022

(51) Int. Cl.
*G06T 19/00*    (2011.01)
*G02B 27/01*    (2006.01)

(52) U.S. Cl.
CPC ........ *G06T 19/006* (2013.01); *G02B 27/0103* (2013.01); *G02B 2027/0178* (2013.01)

(58) Field of Classification Search
CPC .............. G06T 19/006; G02B 27/0103; G02B 2027/0178; G02B 27/017; G02B 27/0179
See application file for complete search history.

(56) References Cited

U.S. PATENT DOCUMENTS

| | | | |
|---|---|---|---|
| 9,495,915 B1 * | 11/2016 | Manyam ................ | G09G 3/344 |
| 2015/0302652 A1 * | 10/2015 | Miller ................ | G02B 27/0172 345/419 |
| 2016/0133170 A1 * | 5/2016 | Fateh ...................... | G06F 3/012 345/428 |
| 2016/0381398 A1 * | 12/2016 | Saxena ................ | H04N 21/816 348/39 |
| 2018/0088323 A1 * | 3/2018 | Bao .................... | G02B 27/0093 |
| 2018/0233075 A1 * | 8/2018 | Boyd .................... | H04L 65/604 |
| 2019/0057549 A1 * | 2/2019 | Aurongzeb ........... | G06F 1/1601 |
| 2020/0341563 A1 * | 10/2020 | Poore .................. | G06K 9/00671 |
| 2021/0090338 A1 * | 3/2021 | Chen .................... | G06T 15/506 |
| 2021/0241676 A1 * | 8/2021 | Hazra ................ | G02B 27/0172 |

FOREIGN PATENT DOCUMENTS

WO    WO-2018148076 A1 *    8/2018

OTHER PUBLICATIONS

Hazra et al., U.S. Appl. No. 62/969,549, filed Feb. 3, 2020, 50 pages. (Year: 2020).*

(Continued)

*Primary Examiner* — Jeffery A Brier
(74) *Attorney, Agent, or Firm* — EIP US LLP

(57) ABSTRACT

An AR system includes one or more image sensors arranged to capture image data representing a scene located within a field of view of the one or more image sensors, a display arranged to enable a user of the AR system to observe a representation or view of the scene, and an augmentation engine. The augmentation engine is arranged to process the captured image data to determine one or more visual characteristics for the captured image data and to determine, in dependence on the determined one or more visual characteristics, one or more properties for an image element to be presented on the display. The augmentation engine is arranged to present the image element, with the determined one or more properties, on the display to overlay the representation or view of the scene.

17 Claims, 6 Drawing Sheets

(56) References Cited

OTHER PUBLICATIONS

Martin Knecht, Christoph Traxler, Werner Purgathofer, and Michael Wimmer, Adaptive Camera-Based Color Mapping for Mixed-Reality Applications, 2011, In 2011 10th IEEE International Symposium on Mixed and Augmented Reality, pp. 165-168. (Year: 2011).*

* cited by examiner

SYSTEM AND METHOD FOR POSITIONING IMAGE ELEMENTS IN AUGMENTED REALITY SYSTEM

BACKGROUND OF THE INVENTION

Field of the Invention

The present invention relates to augmented reality (AR) systems for use in environments with varying lighting conditions.

Description of the Related Technology

An augmented reality (AR) system provides visual information to a user to enhance the user's experience of an environment. An AR system typically includes one or more image sensors arranged to capture images of the environment, and a display arranged to enable the user to view the environment either directly in the case of a transparent display, or indirectly as a representation generated from images captured by the one or more image sensors in the case of an opaque display. The AR system is further arranged to present additional image elements on the display, for example virtual objects, other graphical elements or text information, to overlay the user's view of the environment. An AR system may be embodied, for example, as a headset or other wearable device such as a pair of smart glasses, or alternatively as a smartphone or tablet computer running an appropriate software application.

AR systems may be used in environments where lighting conditions vary significantly. When image elements are overlaid on a representation or view of a scene, varying lighting conditions within the scene may result in poor visibility of certain image elements, for example when positioned in front of a very bright region of the scene, or certain image elements having unsuitable visual characteristics, for example a virtual object having a brightness that is inconsistent the brightness of physical objects in the scene.

SUMMARY

According to a first aspect, there is provided an augmented reality (AR) system. The AR system includes one or more image sensors arranged to capture image data representing a scene located within a field of view of the one or more image sensors, a display arranged to enable a user of the AR system to observe a representation or view of the scene, and an augmentation engine. The augmentation engine is arranged to process the captured image data to determine one or more visual characteristics for the captured image data and to determine, in dependence on the determined one or more visual characteristics, one or more properties for an image element to be presented on the display. The augmentation engine is arranged to present the image element, with the determined one or more properties, on the display to overlay the representation or view of the scene.

According to a second aspect, there is provided a method. The method includes capturing, using one or more image sensors, image data representing a scene located within a field of view of the one or more image sensors, processing the captured image data to determine one or more visual characteristics for the captured image data, and determining, in dependence on the measured one or more visual characteristics, one or more properties for an image element to be presented on a display of an AR system arranged to enable a user of the AR system to observe a representation or view of the scene. The method further includes presenting the image element, with the determined one or more properties, on the display of the AR system to overlay the representation or view of the scene.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further notes that certain examples are described schematically with certain features omitted and/or necessarily simplified for the ease of explanation and understanding of the concepts underlying the examples.

Figure 1:
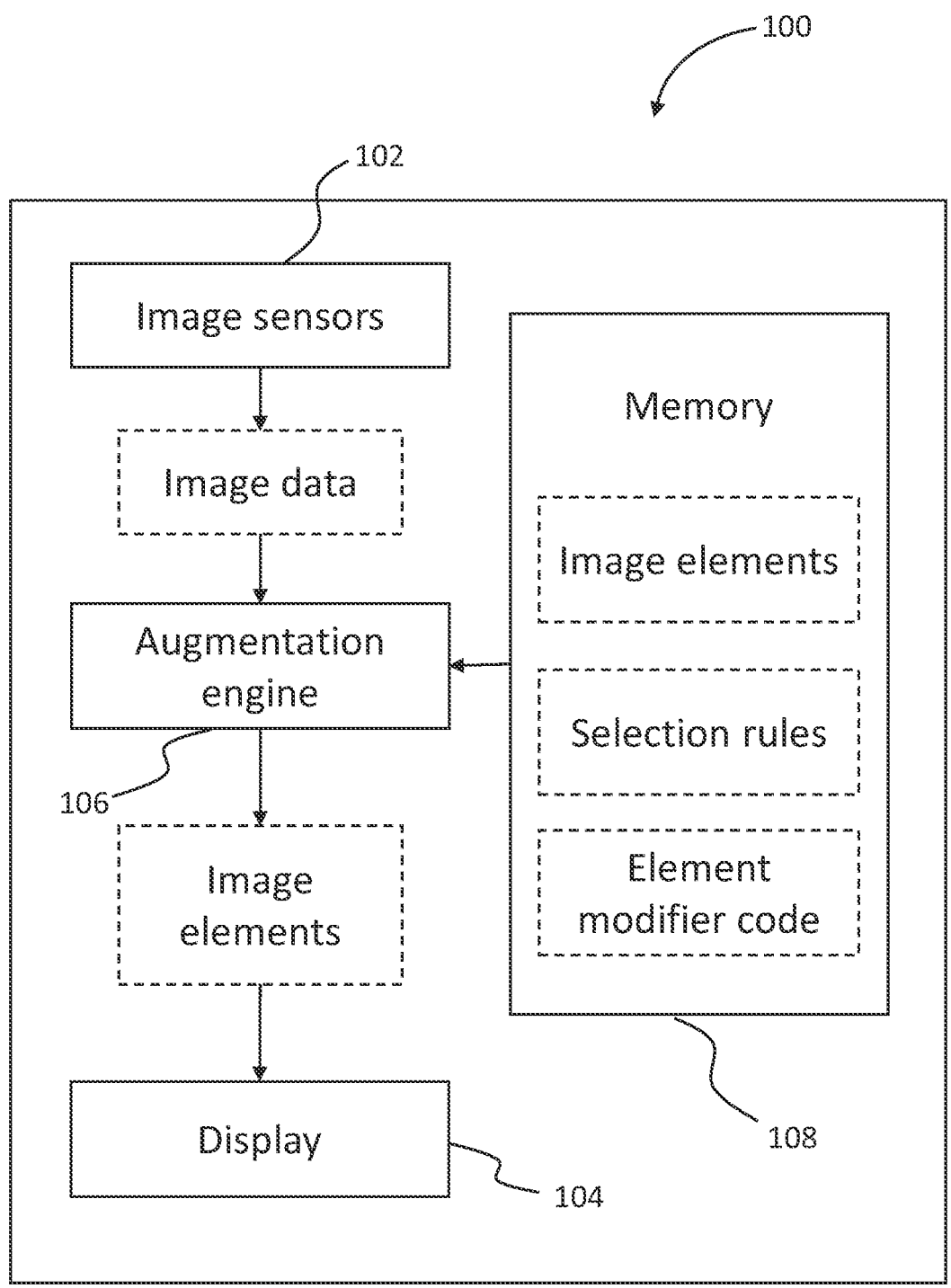
FIG. 1 is a schematic block diagram showing an augmented reality (AR) system in accordance with examples.

FIG. 1 shows an example of an AR system 100 in accordance with examples. The AR system 100 can be embodied as a single AR device, for example a headset, a pair of smart glasses, or any other type of suitable wearable device, or can alternatively be a smart phone, tablet computer, or any other device with components as described hereafter. The AR system 100 can alternatively include multiple devices connected by wired or wireless means, for example a dedicated computing device such as an AR compute unit, a smartphone, a tablet or laptop computer, a desktop computer, a server, one or more devices in a networked system or a cloud-based server. Examples will be described in detail with reference to FIGS. 2 and 3.

The AR system 100 includes one or more image sensors 102 arranged to capture image data representing a scene corresponding to part of an environment falling within the field of view of the one or more image sensors 102. Each of the one or more image sensors 102 may for example be a charged coupled device (CCD) or an active-pixel sensor arranged to generate digital image data comprising an array of pixel values for each of a set of color channels. The one or more image sensors 102 may for example be part of one or more front-facing cameras mounted on an AR headset or pair of smart glasses, or may be part of one or more rear-facing cameras of a smart phone or tablet computer. The field of view of the one or more image sensors 102 may be delimited in the vertical and/or horizontal directions, depending on the number and location of image sensors 102. In the case of multiple image sensors 102, a combined field of view may depend on overlapping fields of view of the individual image sensors 102. For example, in the case of a pair of smart glasses, one or more front-facing cameras may be arranged to face in substantially the same direction as the head of a user wearing an AR headset, in which case the field of view of the one or more cameras may include a whole or part of the user's field of vision. Alternatively, the field of view may include a wider region, for example completely surrounding the user. The cameras may include stereo cameras from which the AR system can derive, using stereo matching, depth information indicating distances to objects in the environment. The sensors may alternatively, or additionally, include depth sensors for determining depth information, for example an infrared camera, a sound navigation ranging (sonar) transceiver, and/or a light detection and ranging (LIDAR) system. The AR system 100 may be configured to combine image data and associated depth information to generate a three-dimensional representation of part of the environment, for example in RGB-D format, and/or as a point cloud or volumetric representation. In some examples, the one or more image sensors 102 may include image sensors capable of detecting radiation other than visible light, for example infra-red radiation in order to provide night vision capabilities for the AR system 100.

The AR system 100 includes a display 104 arranged to enable a user of the AR system 100 to observe, directly or indirectly, the scene corresponding to the part of the environment falling within the field of view of the image sensors 102. The display 104 may, for example, be a transparent display arranged such that the user can observe the scene directly through the transparent display and on which image elements can be projected, for example using waveguiding or laser scanning display technology. Alternatively, the display 104 may be an opaque display arranged to display a representation of the scene, where the representation is derived from the image data captured by the one or more image sensors 102. For example, the display 104 may render the image data directly, or may process the image data by applying filtering or tone mapping, or otherwise modifying the image data to generate the representation of the scene to be presented on the display 104.

The AR system 100 includes an augmentation engine 106 comprising processing circuitry and memory circuitry and arranged to provide visual information to the user of the AR system 100 to enhance the user's experience of the environment. In particular, the augmentation engine 106 is arranged to present image elements on the display 104 to overlay the representation or view of the scene, for example in dependence on image data captured by the one or more image sensors 102 and possibly in dependence on information derived from other sensors. In this sense, to overlay means to render the image element on the display 104 so that at least part of the image element is visible on the display 104. This includes the situation where the image element is positioned such that part of the image element appears to be occluded by a physical object in the environment, or to occlude a physical object in the environment, provided at least part of the image element is visible on the display 104. In some examples, an image element such as a virtual object may be rendered in an apparent location in the scene depending on image data captured by the image sensors 102, and associated depth information, to appear as if the image element is present in the environment.

The augmentation engine 106 is arranged to select image elements and/or to generate composite image elements from image components stored in the memory 108 in accordance with a set of selection rules and/or in dependence on user input. The selection rules may specify, for example, that when a certain type of object is detected in the image data generated by the one or more image sensors 102, a particular image element is to be displayed. The image elements may be, for example, virtual objects for positioning on the display so as to have the appearance of being located in the environment. Alternatively, or additionally, the image elements may be text elements or graphical elements identifying objects in the environment and/or providing information relating to objects in the environment. An example of a composite image element is a table with multiple fields each displaying information about an object in the environment. For example, when a particular type of packaged food item is detected, the augmentation engine 106 may generate a table giving nutritional information for the food item and/or the price of the food item in various nearby shops. In some examples, image elements may be holographic image elements and the display 104 may include holographic display technology, for example including a spatial light modulator (SLM), for displaying the holographic image elements to be viewed by the user.

In addition to selecting/generating image elements for display, the augmentation engine 106 is arranged to determine properties for the image elements in dependence on the image data captured by the one or more image sensors 102. In particular, as will be explained in more detail hereafter, the augmentation engine 106 is arranged to determine properties for the image elements based on visual characteristics determined from the image data. In this disclosure, visual characteristics, which may also be referred to as pixel characteristics, refer to properties which can be determined for individual pixels of the image data in dependence on their associated pixel values (for example, RGB pixel values) and pertain to the appearance of those pixels, as opposed to the semantic information conveyed by the image data. Visual characteristics may be determined for regions of an image containing multiple pixels, for example by averaging. Examples of visual characteristics include RGB pixel values or other sets of color values representative of pixel color (for example, YUV values or color codes), luminescence values and radiance values, or other measurements of pixel brightness. Visual characteristics may depend on the colors and textures of physical objects in the scene, as well as lighting conditions of the environment.

As mentioned above, the augmentation engine 106 includes processing circuitry and memory circuitry. The processing circuitry may comprise various processing units including a central processing unit (CPU), a graphics processing unit (GPU) for rendering image elements on the display 104, and/or a neural processing unit (NPU) for efficiently performing neural network operations. The AR system may use neural networks for certain tasks including object detection and simultaneous localization and mapping (SLAM). The augmentation engine 106 may additionally or alternatively include other specialist processing units, such as application specific integrated circuits (ASICs), digital signal processors (DSPs), or field programmable gate arrays (FPGAs). The memory circuitry 108 includes non-volatile storage, for example in the form of one or more solid-state drives (SSDs), along with non-volatile and volatile random-access memory (RAM), for example static random-access memory (SRAM) and dynamic random-access memory (DRAM). Other types of memory can be included, such as removable storage, synchronous DRAM, and so on.

In addition to the components described above, the AR system 100 may include various other features not shown in FIG. 1, for example a power supply, additional sensors such as position and orientation sensors for determining a position and orientation (referred to collectively as a pose) of the user of the AR system 100. The position and orientation sensors may include a global positioning system (GPS) module, one or more accelerometers, one or more gyroscopes, and/or a Hall effect magnetometer for determining orientation (an electronic compass). The AR system 100 may, for example, include an internal measurement unit (IMU) comprising an accelerometer and a gyroscope. The AR system 100 may additionally or alternatively be capable of determining or refining an estimated pose of the user by analyzing image data and, optionally, depth information using simultaneous location and mapping (SLAM) techniques.

The AR system 100 may include one or more output devices in addition to the display 104, for example loudspeakers mounted in an earpiece or pair of headphones, allowing the AR system 100 to output audio information to the user. The AR system 100 may further include haptic output devices arranged to generate forces to cause motion of part or all of the AR system 100, including for example vibrations, clicks, or other movements that can be detected by the user's sense of touch. In an example, an AR headset may send a signal to a further device such as a smart watch, fitness tracker, bracelet or other wearable device, or a smartphone, causing the further device to provide a haptic output for the user.

The AR system 100 may include input devices for receiving user input, for example one or more microphones for capturing speech or other sounds. The AR system 100 may further be arranged to perform speech recognition and to react to spoken instructions from the user. The input devices may include one or more eye tracking sensors arranged to track orientations and/or motion of the user's eyes. An eye tracking sensor may, for example, be an optical eye tracking sensor capable of tracking an orientation of an eye by analyzing images of the eye generated by an eye-facing camera. An eye tracking sensor may generate eye tracking data from which the AR system 100 can determine which part of the environment, or which object in the environment, the user is currently looking at. An eye tracking sensor may further be used to determine when a user blinks or closes his or her eyes, which the AR system 100 can use as an input signal. The input devices may further include other types of controller, for example buttons or touch input devices. For example, the AR system 100 may include one or more scroll-wheels, touch-sensitive regions or trackpads. The one or more image sensors 102 of the AR system 100 may further function as user input devices, for example to facilitate gesture recognition. Furthermore, the accelerometers and/or electronic compass may be used to determine when a user nods or shakes his or her head.

Figure 2:
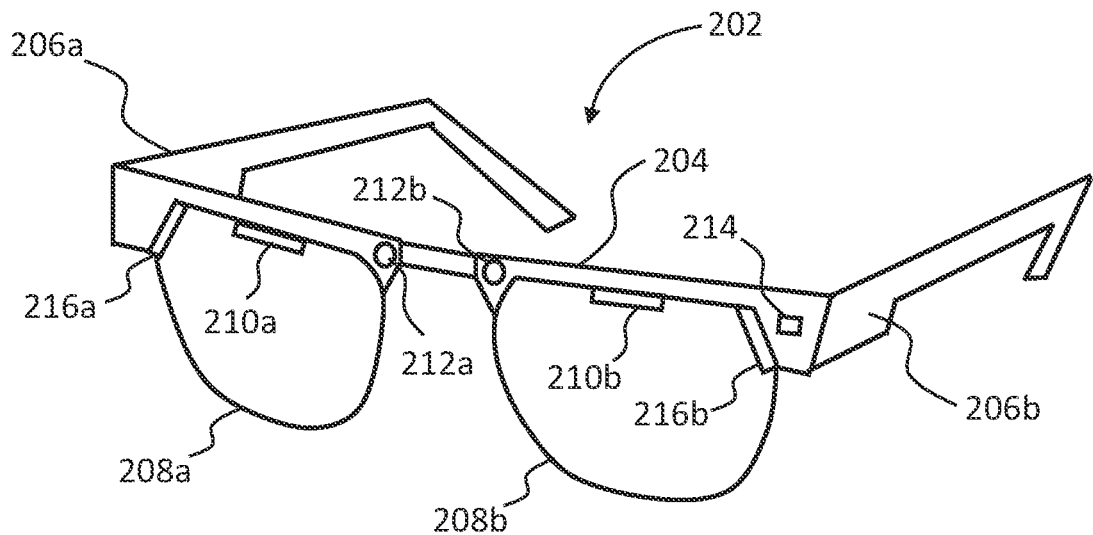
FIG. 2 shows an example of a pair of smart glasses.

FIG. 2 shows an example of an AR system embodied as a pair of smart glasses 202. The smart glasses 202 may be paired with another device such as a smartphone, smart watch or tablet computer, or alternatively may function as a standalone AR system without needing to be paired with another device. The smart glasses 202 include a central frame portion 204 and two folding arms 206a, 206b, where the central portion 204 acts as a support for two lenses 208a, 208b. The lenses 208a, 208b in this example are neutral, though in other examples the lenses could be corrective lenses matching a prescription of a specific user, and/or could be tinted, for example in the case of smart sunglasses. Each of the lenses 208a, 208b is a transparent display on which a corresponding projector component 210a, 210b is arranged to present image elements to be viewed by the user.

The central frame portion 204 houses two front-facing cameras 212a, 212b with a combined field of view approximately corresponding to the field of vision of the user. The central frame portion 204 further houses a microphone array 214 for receiving vocal input from the user, and optical eye tracking sensors 216a, 216b for tracking orientation and motion of the user's right and left eye respectively. The arms 206a, 206b house a dedicated power supply, along with processing circuitry and memory circuitry of an augmentation engine arranged to present image elements on the lenses 208a, 208b using the corresponding projector components 210a, 210b, in dependence on image data captured by the front-facing cameras 212a, 212b. The arms 206a, 206b further house a global positioning system (GPS) receiver, an IMU, and a communication module including an antenna for communicating wirelessly with other devices. It is noted that, whilst the smart glasses 202 in this example include the necessary components to function independently, the smart glasses 202 may be coupled to a further device such as a smartphone with certain components corresponding to those of the smart glasses 202, for example a GPS receiver, accelerometers, processing circuitry and memory circuitry. Where appropriate, the smart glasses 202 can make use of the corresponding components of the further device instead of using the components of the smart glasses 202, for example to save battery power of the smart glasses 202. In some examples, functions of an AR system may be shared between a wearable device such as a pair of smart glasses and a further device such as a smartphone. This may, for example, enable the wearable device to have a desirable size, weight and form factor. For example, a pair of smart glasses may be similar in appearance and feel to a regular pair of glasses, such that a user can comfortably wear the smart glasses for prolonged periods of time and on an everyday basis.

The smart glasses 202 in the present example are arranged to determine a pose (i.e. position and orientation) of the user using the onboard GPS receiver and the IMU of the smart glasses 202, and/or by processing image data and depth information from the cameras 212a, 212b using SLAM. The smart glasses 202 may be configured to continually monitor the position of the user, or alternatively to determine the position of the user only when certain events are detected (for example, when movement of the user is detected by the accelerometers).

The smart glasses 202 can be configured in accordance with preferences of the user, for example using an app on a smartphone paired with the smart glasses 202 or directly using the input devices of the smart glasses 202. For example, the user can use the app to select the type of information that is displayed on the lenses 208a, 208b, and whether the smart glasses 202 continually monitor the location of the user as mentioned above. Furthermore, the smart glasses 202 may be configured differently for different users. The smart glasses 202 may determine the identity of the current user either using a log-in system for example using an app on a smartphone paired with the smart glasses 202, or by biometric identification using one or more of the input devices of the smart glasses 202.

Figure 3:
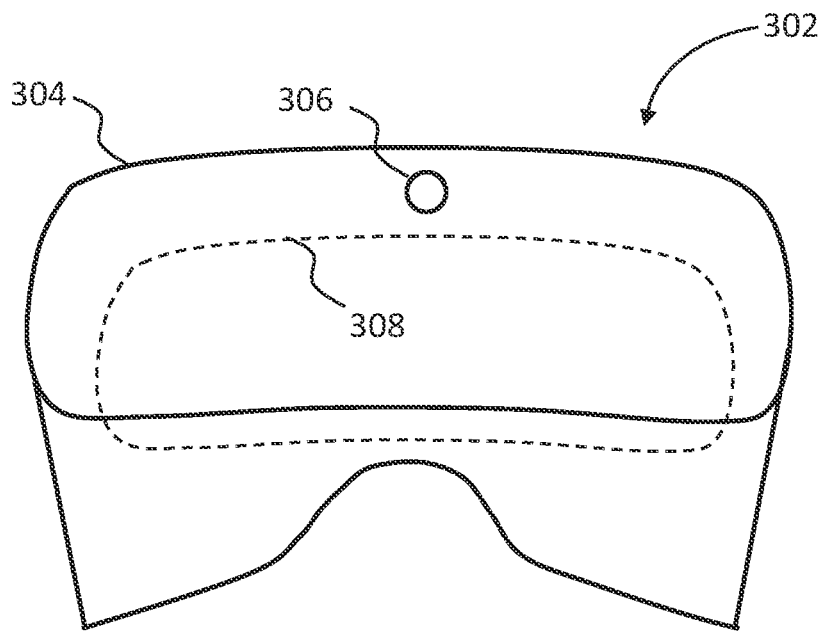
FIG. 3 shows an example of an AR headset.

FIG. 3 shows an example of an AR system embodied as an AR headset 302. The AR headset 302 includes a housing 304 arranged to be mounted on a user's head using an adjustable strap (not shown). An outer portion of the housing 304 facing away from the user of the AR headset 302 houses a front-facing camera 306 with a field of view approximately corresponding to the field of vision of the user if the user were to take off the AR headset 302. The camera 306 is arranged to capture image data representing a scene corresponding to part of an environment within the field of view of the camera 306. An inner portion of the housing 304 facing towards the user houses an opaque display 308, shown dashed in FIG. 3. The opaque display 308 is arranged to display representations of the scene derived from the image data captured by the camera 306. The representations displayed on the opaque display 308 may for example be generated by application of a tone mapping operator to the image data captured by the camera 306, to account for the low dynamic range of the opaque display 308 relative to the dynamic range of the camera 306. In this way, the representations of the scene may be perceived as similar to a view of the scene observed by a human. Different types of local and global tone mapping operators suitable for this purpose are known in the art, for example tone mapping operators which utilize machine learning. In other examples, other operations may be performed in addition to, or as an alternative to, the application of a tone mapping operator, for example to stylize or otherwise modify the appearance of the environment as displayed on the opaque display 308.

The AR headset 302 includes an augmentation engine arranged to present image elements on the opaque display 308 to overlay the representation of the environment displayed on the opaque display 308. As will be described in more detail hereafter, the augmentation engine is arranged to present image elements with properties depending on the image data captured by the camera 306. The AR headset 302 includes various further components not shown in FIG. 3, for example input and/or output devices equivalent to some of those described above with reference to FIG. 2.

Figure 4:
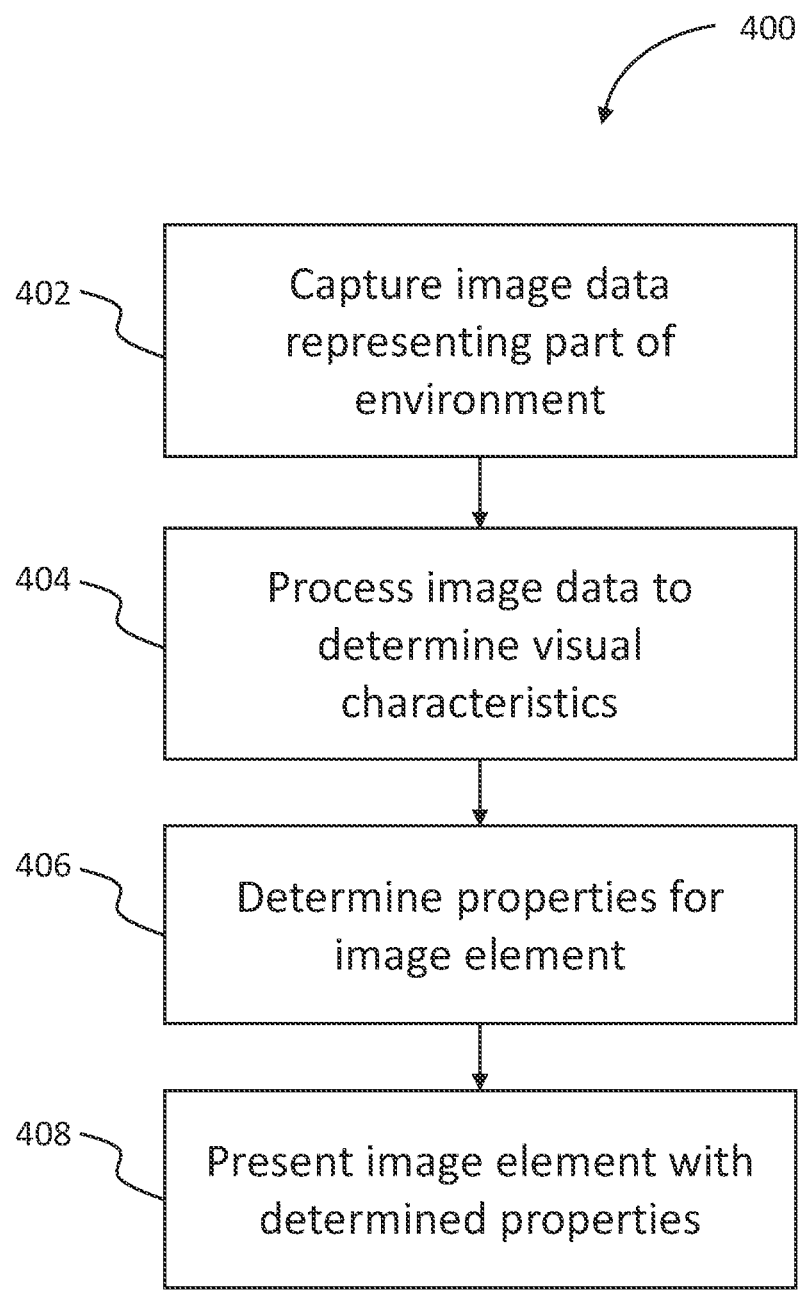
FIG. 4 is a flow diagram representing a method performed by an AR system in accordance with examples.

FIG. 4 shows an example of a method 400 performed by the AR system 100 in accordance with the present disclosure. The AR system 100 captures, at 402, image data using the one or more image sensors 102. The image data represents a scene corresponding to part of an environment falling within the field of view of the one or more image sensors 102. The image data may be high dynamic range (HDR) image data The AR system 100 processes, at 404, the image data captured at 402 to determine one or more visual characteristics for the image data. The visual characteristics may include, for example, radiances of pixels within the image data, for example in the form of an HDR radiance map. Alternatively, or additionally, the visual characteristics may include RGB pixel values or other representations of pixel color, and/or luminescence values for the pixels within the image data. Determining the visual characteristics may include additional processing of such values, for example to segment the image data into contiguous regions of differing visual characteristics. This further processing may be performed, for example, using known machine learning or pixel clustering methods.

The AR system 100 determines, at 406, one or more properties for an image element to be presented on the display 104, in dependence on the one or more visual characteristics determined at 404. The augmentation engine 106 first determines a set of one or more image elements to be presented on the display 104. Determining the set of one or more image elements may include, for example, performing object detection to identify objects in the environment, then determining the set of image elements in dependence on the identified objects and a set of element selection rules. The determined set of image elements may therefore depend on which objects appear in the scene represented by the image data. The determined set of image elements may further depend on other factors, for example a location determined using GPS and/or SLAM, the identity of the current user of the AR system 100, and/or configuration options chosen by the user. In some examples, the image elements may be generated in dependence on data received from a remote source. For example, where a particular retail outlet is identified in the image data, the AR system 100 may access a web page or application programming interface (API) associated with the retail outlet and generate image elements providing information such as opening times, menus, or availability of particular products at the outlet. The image elements may include virtual objects and/or other graphical elements, and/or may include text elements. Various uses of AR to overlay image elements on a representation or view of a scene have been proposed and implemented, and it is not an object of the present disclosure to propose novel uses for an AR system.

Having determined the set of image elements to be presented on the display 104, the augmentation engine 106 determines one or more properties for at least one of the image elements in in dependence on the visual characteristics determined at 404. In a first example, the one or more properties for an image element include a position on the display 104 at which to present the image element. In this way, the image element may be presented so as to ensure that the image element is visible in front of the background. The AR system 100 presents, at 408, the set of image elements on the display 104 with the properties determined at 406.

Figure 5:
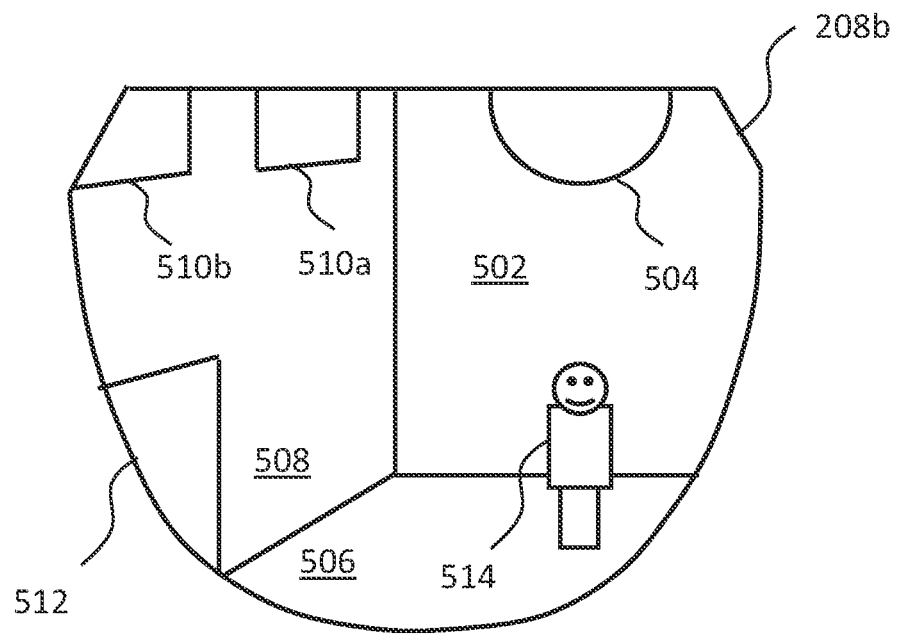
FIG. 5 shows a first example of a scene observed by a user of the smart glasses of FIG. 2.

FIG. 5 shows an example of a scene as viewed by a user of the smart glasses 202 through the left lens 208b of the smart glasses 202. The scene includes a sky portion 502 and part of the sun 504, along with a ground portion 506 and a building portion 508 with two windows 510a, 510b and a door 512. The scene also includes a person 514. In this example, the different portions differ in brightness, and therefore the visual characteristics for the different portions are different from one another. Specifically, the sun 504 is brightest, followed by the first window 510a (due to direct reflection of light from the sun 504), followed by the sky portion 502, followed by the second window 510b, the ground portion 506, the building portion 508 and the door 512.

Figure 6:
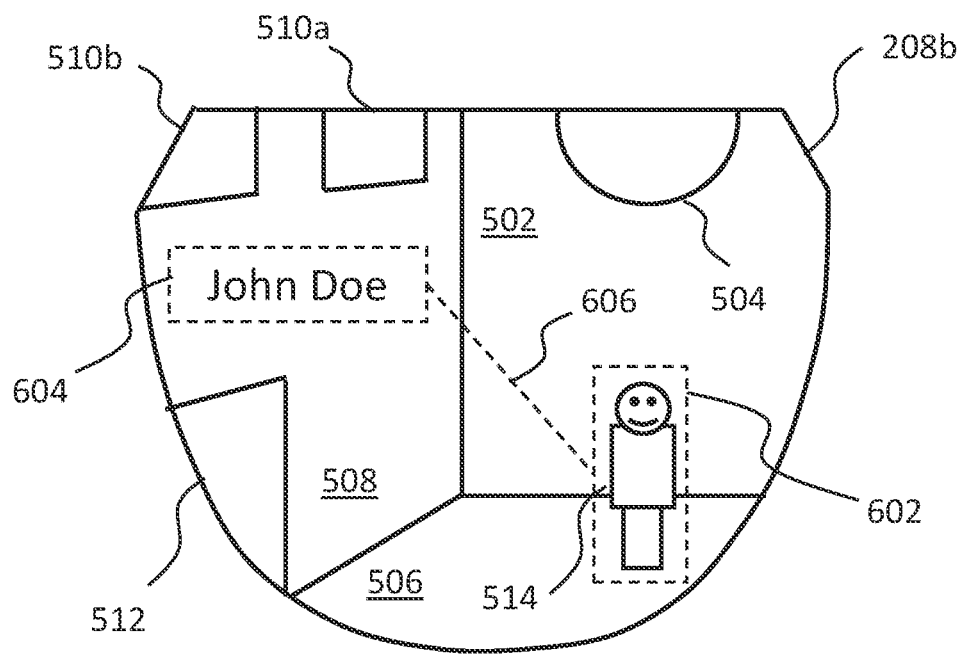
FIG. 6 shows an example in which image elements are overlaid on the scene of FIG. 5.

FIG. 6 shows an example of a set of image elements overlaid on the scene of FIG. 5. The image elements in this example include a bounding box 602 for the physical person 514 and a virtual label 604 with the name of the person 514 (as determined using facial recognition) linked to the bounding box 602 by a connector line 606. In accordance with the present disclosure, the augmentation engine of the smart glasses 202 determines a position for the label 604 such that the label 604 appears on a region of the display for which the view of the environment is relatively dark, namely the building portion 508. In this way, potential issues in which the visibility of the label 604 is compromised by glare from the sun 504 or the reflection of the sun 504 in the first window portion 510b are mitigated. In this example, the augmentation engine determines the position according to a set of hierarchical positioning rules. The bounding box 602 is first positioned (and its dimensions determined) so that the bounding box 602 contains the person 514. The label 604 is free to be positioned anywhere on the display, provided that the label 604 is not overlaid on another image element such as the bounding box 602, and possibly certain other types of object identified in the scene. The label 604 is positioned in dependence on the determined visual characteristics for the scene. In this example, the label 604 is positioned to overlay the building portion 508, which as mentioned above is one of the least bright regions of the scene. The connector line 606 is then positioned to connect the bounding box 602 and the label 604.

In order to determine a position of an image element such as the label 604, the augmentation engine 106 may, for example, determine a set of candidate positions independently of the visual characteristics of the image data, for example in accordance with a set of positioning rules, then score each of the candidate positions in dependence on the visual characteristics and select the candidate position with the highest score. For example, the augmentation engine 106 may select the candidate position for which the average brightness (e.g. luminescence or radiance) of pixels underlying and/or surrounding the image element would be lowest, or a position in which the average contrast between the image element and the physical background surrounding the image element would be greatest, based on the colors of the image element and the scene. Alternatively, the augmentation engine 106 may determine a first candidate position for the image element using a set of positioning rules, then check whether the pixels of the image data underlying the image element in the first position satisfy predetermined criteria. The predetermined criteria may include the average radiance or luminescence of pixels underlying the image element being lower than a predetermined value, the average contrast between the image element and the physical background surrounding the image element being greater than a predetermined value, or the brightness of a certain proportion of the pixels underlying and/or surrounding the image element being lower than a predetermined value (corresponding to a confidence interval). If the pixels do not satisfy the predetermined criteria, the augmentation engine 106 determines a second candidate position for the image element using a set of positioning rules, and so on iteratively until a candidate position is found in which the pixels underlying the image element satisfy the predetermined criteria. In a further example, the augmentation engine 106 may identify different regions of the image corresponding to respective objects or alternatively corresponding to portions with different visual characteristics (for example using machine learning-based image segmentation, edge detection, pixel clustering, or any other suitable technique), then score each identified region in dependence on visual characteristics for that region, then determine a position for the image element within the identified region having the highest score. In a further example, the augmentation engine 106 may use machine learning directly to determine a position for the image element based on the visual characteristics determined from the image data. For example, supervised learning may be used to train a neural network of other machine learning model to process an HDR radiance map (which may be downsized, pooled, or otherwise modified before being input to the machine learning model) to determine a position for an image element.

Further to determining positions for certain image elements, the augmentation engine 106 may determine other properties for one or more of the image elements in dependence on the determined visual characteristics. For example, the augmentation engine 106 may determine color and/or brightness properties, and/or other rendering properties for the image elements. In the example of FIG. 6, the augmentation engine may determine a color for the label 604 to ensure contrast with the average color of pixels within the building portion 508 upon which the label 604 is overlaid.

In some examples, rendering properties for an image element may be determined using a tone mapping operator. For example, the augmentation engine 106 may first process the image data generated by the image sensors 102 to generate a composite image in which initial renderings of one or more image elements are overlaid on the scene in positions determined by the augmentation engine, for example in dependence on visual characteristics determined for the image data as described above. The initial renderings of the one or more image elements may have default properties, for example default brightness and/or color properties, and/or may have certain rendering properties such as color depending on visual characteristics of the scene as discussed above. The augmentation engine 106 may then apply a tone mapping operator to the composite image, which has the result of modifying the appearance of the initial renderings. The tone mapping operator may be a global tone mapping operator such as a gamma filter, or may be a local tone mapping operator. The tone mapping operator may for example be a machine learning tone mapping operator.

In examples where a representation of the scene is displayed to the user (for example in the case of an opaque display), the tone mapping operator may modify the visual characteristics of the background as well as the image elements. In examples where the user views the scene directly, the tone mapping operator may only modify the visual characteristics of the image elements. In other examples, the step of generating a composite image may be omitted, and the properties of the image elements may be determined directly from the visual characteristics of certain regions of the image data captured by the image sensors 102 (for example, regions of the image data immediately surrounding the position in which the image element is to be overlaid on the scene).

Figure 7:
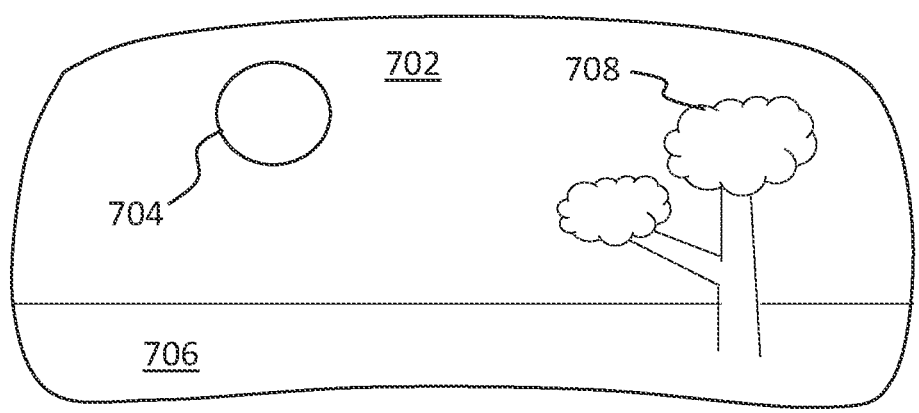
FIG. 7 shows an example of a representation of a scene observed by a user of the AR headset of FIG. 3.
Figure 8:
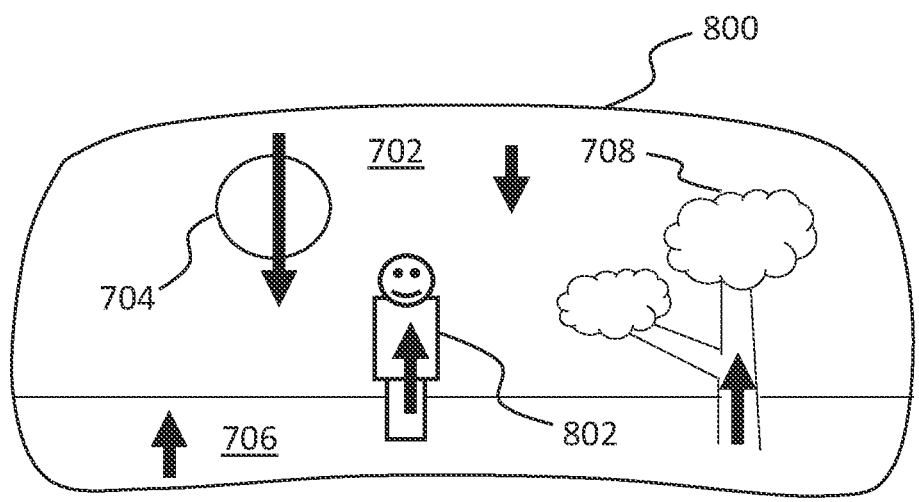
FIG. 8 shows an example in which image elements are overlaid on the representation of the scene of FIG. 7.

FIG. 7 shows an example of a scene falling within the field of view of the camera 306 of the AR headset 302. The scene is an outdoor scene and includes a sky portion 702, the sun 704, a ground portion 706, and a tree 708. The sun 704 is brighter than the sky portion 704, which is brighter than the ground portion 706 and the tree 708. FIG. 8 shows a composite image 800 in which an initial rendering of a virtual object 802 is overlaid on a representation of the scene of FIG. 8. The virtual object 802 in this example is a likeness of a person. In this example, a local tone mapping operator is applied to the composite image to generate a tone-mapped composite image, then the tone-mapped composite image is presented on the display 308. As a result, the virtual object 802 as presented to the user of the AR headset 302 has a modified appearance compared with the initial rendering. The solid upward arrows represent portions of the composite image for which the brightness is increased by the tone mapping operation, and the solid downward arrows represent portions of the composite image for which the brightness is decreased by the tone mapping operation. The relative sizes of the arrows represent the amount by which the brightness is modified by the tone mapping operation.

In the example of FIG. 8, it is observed that the tone mapping operation modifies the appearance of objects appearing in the original scene, as well as the appearance of the virtual object 802. In other examples, the tone mapping operation may be restricted to modifying the appearance of image elements only. This may be the case, for example, if a tone mapping operator has already been applied to the image data generated by the camera 306. Restricting the action of the tone mapping operator to the image elements may in some cases reduce the processing required by the tone mapping operation. It is noted, however, that even if the tone mapping operator only modifies the appearance of the image elements, the tone mapping operator generally modifies the appearance of the image elements in dependence on at least some of the image data corresponding to the background scene (for example, at least regions immediately surrounding the image elements).

Figure 9:
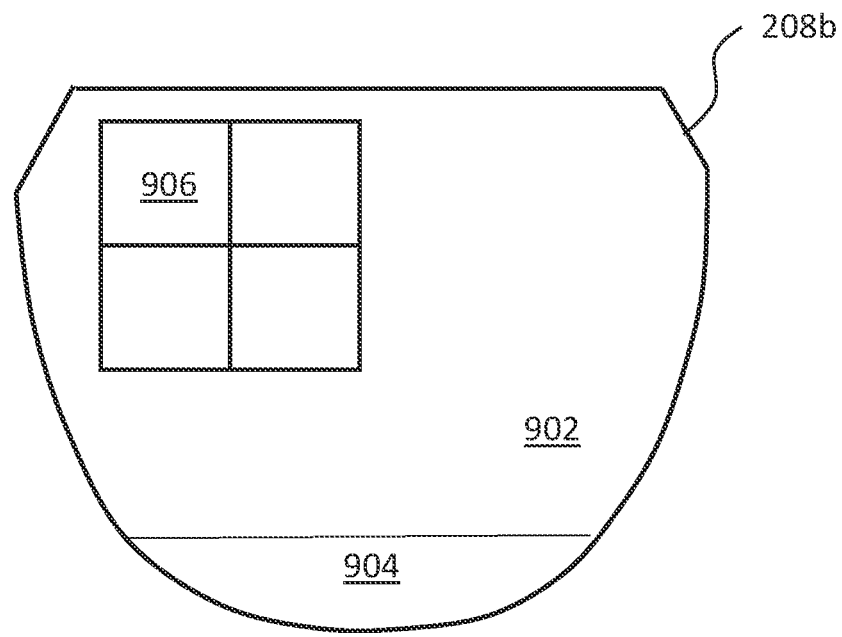
FIG. 9 shows a second example of a scene observed by a user of the smart glasses of FIG. 2.
Figure 10:
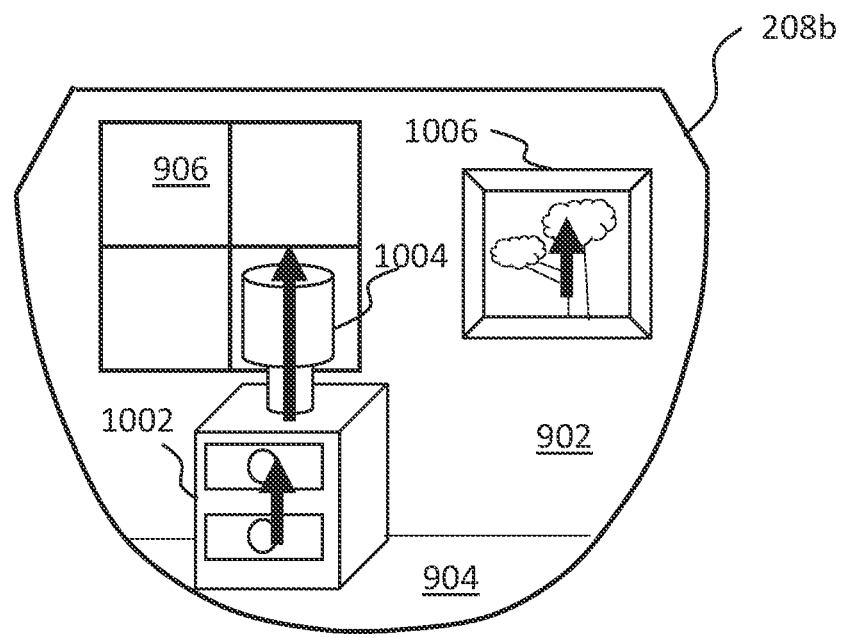
FIG. 10 shows an example in which image elements are overlaid on the scene of FIG. 9.

FIG. 9 shows an example of a scene as viewed by a user of the smart glasses 202 through the left lens 208b of the smart glasses 202. The scene is an interior of a room and includes a wall portion 902, a floor portion 904, and a window 906. The window 906 is brighter than the wall portion 902 and the floor portion 904. FIG. 10 shows an example in which a set of virtual objects is overlaid on the scene of FIG. 9. The set of virtual objects includes a chest of drawers 1002, a lamp 1004, and a painting 1006. In this example, the AR functionality of the smart glasses 202 is used to help a user imagine how the interior of the room will look with various objects placed in the room, for interior decorating purposes. In this example, the user selects the virtual object and then positions the selected virtual object using hand gestures. The smart glasses 202 in this example use depth information derived from the stereo matching of image data generated by the cameras 212a, 212b to scale the virtual objects appropriately for the scene. The virtual objects may further be scaled in response to user input, for example using gesture recognition. Once the virtual objects have been positioned, the augmentation engine generates a composite image in which initial renderings of the virtual objects are overlaid on a representation of the scene. In this example, the initial renderings have default color and brightness properties. The augmentation engine then applies a local tone mapping operator to the composite image to determine any modification to the brightness properties of the initial renderings. In the example of FIG. 10, the average brightness of the lamp 1004 is increased significantly (indicated by the largest solid arrow) due to the lamp 1004 being positioned in front of the window 906. The average brightness of the chest of drawers 1002 is also increased, but to a lesser degree than the brightness of the lamp 1004. The average brightness of the painting 1006 is also increased, but to a lesser degree than the brightness of the chest of drawers 1002. In this example, the local tone mapping operator works on a pixel level, and therefore the brightness of different parts of each virtual object may be modified differently. In other examples, the brightness of every pixel of a given virtual object may be modified in the same way. It is noted that, although the appearance of the virtual objects are determined in dependence on the visual characteristics of the background scene, the tone mapping operator in this example only needs to determine for the appearance of the image elements, since the user views the scene directly through the lenses 208a, 208b. Although in this example the tone mapping operator increases the brightness of the virtual object, in other examples a tone mapping operator may be used for other purposes, for example to lower the brightness of virtual object when overlaid on a dark background in order to give a realistic effect, or to create other desired effects in dependence on visual characteristics of the scene. The extent to which a tone mapping operation or other operation of an augmentation engine modifies the appearance of an image element may depend on one or more attributes or capabilities of the display. Display attributes may include, for example, a dynamic range of the display or a maximum brightness of the display. For example, in the case of a display with a high dynamic range and capable of achieving high brightness and contrast, a low degree of modification of an image element may be required to achieve a desired visibility of the image element. By contrast, in the case of a display with a low dynamic range (for example certain transparent displays), a greater degree of modification of an image element may be required to achieve a desired visibility of the image element.

In the example of FIGS. 5 and 6, the augmentation engine of the smart glasses 202 modifies properties of image elements selected in accordance with selection rules. In the example of FIGS. 9 and 10, the augmentation engine of the smart glasses 202 modifies properties of image elements selected by the user. In some examples, the augmentation engine may additionally or alternatively generate one or more image elements in dependence on the determined visual characteristics, for the purpose of increasing an opacity of a portion of the transparent display, tinting a portion of the transparent display, or otherwise reducing an amount of light reaching the user's eye from part of the environment. For example, an image element may be generated to increase the opacity of a portion of the transparent display corresponding to a region of the image data determined to have a brightness greater than a threshold value. The portion of the transparent display may thereby be tinted, having the effect of tone mapping the user's direct view of the scene. The opacity and/or color of the image element may depend on the visual characteristics of said region of the image data. Moreover, the opacity of the image element may vary, for example as determined using a tone mapping operator. For example, an image element may be generated to increase an opacity of a portion of the transparent display corresponding to a region of the image data for which the tone mapping operator would reduce brightness. In the example of FIGS. 5 and 6, an image element may be generated with a relatively high opacity to cover the sun 504. Alternatively, an image element of varying opacity may be generated to cover the sky portion 502 and the sun 504, where the opacity of the image element is greater at the sun 504 than at the sky portion 502. In the example of FIGS. 9 and 10, an image element may be generated to cover the window 906, or the portion of the window 906 not covered by the lamp 1004.

The above embodiments are to be understood as illustrative examples of the invention. Further embodiments of the invention are envisaged. For example, an augmentation engine of an AR system may be configured to determine properties for image elements in dependence on an identity of the current user of the AR system, as determined for example by a log-in system or biometric identification. The properties may be determined in dependence on preferences of the current user or particular attributes of the current user, such as the eyesight of the user. For example, for a color-blind user, particular colors may be selected for the image elements in order to ensure that sufficient contrast with the background scene is perceived by the user. Alternatively, the sharpness of an image element may be modified in dependence on a lens prescription for the user and a distance from the user at which the image element is positioned in the scene, for example to ensure the image element appears consistent with the scene. It is noted that the user of the AR system may not necessarily be a human user; the methods discussed herein may similarly be applied for AR systems designed for dogs or other animals.

The type of properties that may be determined for a given image element may depend on the specific application of the AR system and the type of image element. For example, the position of the bounding box 602 in the example of FIG. 6 is determined by the position of the physical person 514, and cannot be modified by the augmentation engine. However, the position of the virtual label 604 is free to be determined by the augmentation engine. Furthermore, the color and brightness of the bounding box 602 and label 604 are free to be determined by the augmentation engine in order to achieve a suitable level of contrast against the background scene. By contrast, the colors and positions of the image elements in the example of FIG. 10 are not free to be determined by the augmentation engine, but the brightness may be modified by the augmentation engine. In other examples, other properties for image elements may be determined or modified by an augmentation engine. In one example, if an image element is to be overlaid on a very bright portion of a scene, the augmentation engine may determine that a wireframe model of the image element is to be presented, instead of a solid object model, in order to increase visibility. In other examples, the color or size of an image element may be modified to ensure visibility of the image element when overlaid on the background scene.

Determining certain properties for image elements may place significant demands on processing resources of an AR system. In particular, application of a tone mapping operator to an image may be computationally expensive. As mentioned above, in some examples only certain portions of an image need to be processed using tone mapping. In one example, eye trackers are used to determine which part of a scene a user is looking toward, and the tone mapping operation is only performed for image elements in the determined part of the scene. In this way, it may not be necessary to process the entire image using the tone mapping operator. Image elements positioned elsewhere in the scene may either not be tone mapped, or a more basic, less computationally expensive, tone mapping operation may be performed for these image elements. An example of a more basic tone mapping operation may be to determine a single brightness modification for an entire image element, rather than tone mapping the image element on a pixel or region basis.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An augmented reality, AR, system comprising:
    one or more image sensors arranged to capture image data representing a scene located within a field of view of the one or more image sensors;
    a display arranged to enable a user of the AR system to observe a representation or view of the scene;
    an eye tracker configured to determine a viewing direction of the user of the AR system; and
    an augmentation engine arranged to:
        process the captured image data to determine one or more visual characteristics for the captured image data;
        determine, based at least in part on the determined one or more visual characteristics, one or more properties for an image element to be presented on the display; and
        present the image element, with the determined one or more properties, on the display to overlay the representation or view of the scene, wherein:
            the one or more properties for the image element include at least one of a color and/or brightness of the image element; and
            determining the one of more properties for the image element comprises applying a tone mapping operator exclusively to a region of the captured image data, the region being dependent on the determined viewing direction of the user of the AR system.

2. The AR system of claim 1, wherein the visual characteristics for the captured image data include radiance values, luminescence values, and/or color values for at least some pixels within the image data.

3. The AR system of claim 1, wherein the one or more properties for the image element include a size of the image element.

4. The AR system of claim 1, wherein the one or more properties for the image element are determined in dependence on one or more display attributes of the display.

5. The AR system of claim 1, wherein determining the one of more properties for the image element comprises:
    processing the captured image data to generate a composite image representing the scene with an initial rendering of the image element overlaid on the scene; and
    applying a tone mapping operator to the composite image thereby to modify the initial rendering of the image element.

6. The AR system of claim 1, wherein the display is an opaque display arranged to generate a representation of scene from the image data captured by the image sensor.

7. The AR system of claim 6, wherein generating the representation of the scene comprises applying a tone mapping operator to the image data captured by the image sensor.

8. The AR system of claim 1, wherein the display is a transparent display arranged for viewing the scene therethrough.

9. The AR system of claim 8, wherein the augmentation engine is arranged to generate the image element to increase an opacity of a portion of the transparent display in dependence on the determined one or more visual characteristics.

10. The AR system of claim 1, wherein the augmentation engine is arranged to determine the one or more properties of the image element in dependence on an identity of the user of the AR system.

11. The AR system of claim 10, wherein the augmentation engine is arranged to determine the one or more properties of the image element in dependence on an eyesight characteristic of the user.

12. The AR system of claim 1, wherein:
    the display comprises a holographic display;
    the image element is a holographic image element; and
    presenting the image element on the display comprises presenting the image element using the holographic display.

13. The AR system of claim 1, wherein the one or more properties for the image element include a position on the display at which to present the image element.

14. A method comprising:
- capturing, using one or more image sensors, image data representing a scene located within a field of view of the one or more image sensors;
- processing the captured image data to determine one or more visual characteristics for the captured image data;
- determining, using an eye tracker, a viewing direction of a user of an AR system;
- determining, based at least in part on the determined one or more visual characteristics, one or more properties for an image element to be presented on a display of the AR system arranged to enable the user of the AR system to observe a representation or view of the scene; and
- presenting the image element, with the determined one or more properties, on the display of the AR system to overlay the representation or view of the scene, wherein:
  - the one or more properties for the image element include at least one of a color and/or brightness of the image element; and
  - determining the one of more properties for the image element comprises applying a tone mapping operator exclusively to a region of the captured image data, the region being dependent on the determined viewing direction of the user of the AR system.

15. The method of claim 14, wherein the display is an opaque display arranged to generate a representation of scene from the image data generated by the image sensor.

16. The method of claim 14, wherein the display is a transparent display arranged for viewing the scene therethrough.

17. A non-transient storage medium comprising machine-readable instructions which, when executed by a computing system, cause the computing system to:
- process image data representing a scene located within a field of view of one or more image sensors, to determine one or more visual characteristics for the image data;
- receiving data from an eye tracker indicating a viewing direction of a user of the computing system;
- determine, based at least in part on the determined one or more visual characteristics, one or more properties for an image element to be presented on a display arranged to enable the user of the computing system to observe a representation or view of the scene; and
- present the image element, with the determined one or more properties, on the display to overlay the representation or view of the scene, wherein
  - the one or more properties for the image element include at least one of a color and/or brightness of the image element; and
  - determining the one of more properties for the image element comprises applying a tone mapping operator exclusively to a region of the captured image data, the region being dependent on the indicated viewing direction of the user of the computing system.

* * * * *